United States Patent [19]
Moon

[11] Patent Number: 5,676,432
[45] Date of Patent: Oct. 14, 1997

[54] APPARATUS FOR CONTROLLING BRAKE PRESSURE APPLIED TO THE WHEELS OF AUTOMOBILES USING PRESSURE FLUID

[75] Inventor: Sung-Dai Moon, Kyeongsangbuk-Do, Rep. of Korea

[73] Assignee: Daewoo Electronics Co., Ltd., Seoul, Rep. of Korea

[21] Appl. No.: 576,899

[22] Filed: Dec. 22, 1995

[30] Foreign Application Priority Data

Feb. 21, 1995 [KR] Rep. of Korea .................. 95-3372

[51] Int. Cl.$^6$ .................. B60T 13/68; B60T 8/34
[52] U.S. Cl. .................. 303/119.2; 137/625.22
[58] Field of Search .................. 303/113.1, 116.1, 303/119.1, 119.2; 251/129.11, 129.12; 137/625.22, 625.85

[56] References Cited

U.S. PATENT DOCUMENTS

| | | | |
|---|---|---|---|
| 1,216,088 | 2/1917 | Caldwell | 137/625.22 |
| 1,934,124 | 11/1933 | Hubbard | 137/625.22 |
| 2,312,941 | 3/1943 | Tucker | 137/625.22 |
| 4,768,843 | 9/1988 | Baughman et al. | 303/119.2 |

FOREIGN PATENT DOCUMENTS

| | | | |
|---|---|---|---|
| 113874 | 9/1981 | Japan | 251/129.11 |
| 263784 | 12/1985 | Japan | 251/129.11 |
| 21076 | 1/1990 | Japan | 251/129.11 |

*Primary Examiner*—Matthew C. Graham
*Attorney, Agent, or Firm*—Fish & Richardson, P.C.

[57] ABSTRACT

A brake pressure control apparatus for automobiles with an anti-lock braking system, which can be easily operated with a simple construction, and in which a rotary valve can be immediately returned to its initial position after the first ABS operation has finished in order to prepare the second ABS operation, is disclosed. The apparatus has a housing connected to a hydraulic pump to guide the pressure fluid to the apparatus, a motor mounted on the upper surface of the housing to generate a rotational force, a bushing for guiding the pressure fluid from the housing into the apparatus, a rotary valve rotatably and movably accommodated in the bushing to transfer the pressure fluid which has flowed through the bushing to a wheel cylinder or a fluid tank, and a spring for pushing the rotary valve downwards. The apparatus can be manufactured with reduced cost, and can be easily applied to the ABS.

17 Claims, 7 Drawing Sheets

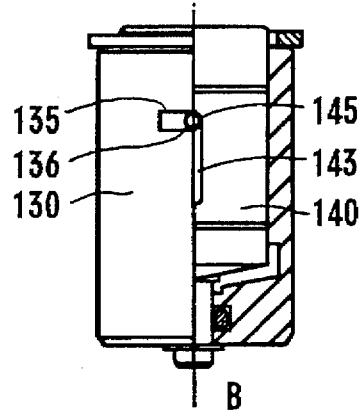
FIG. 3A
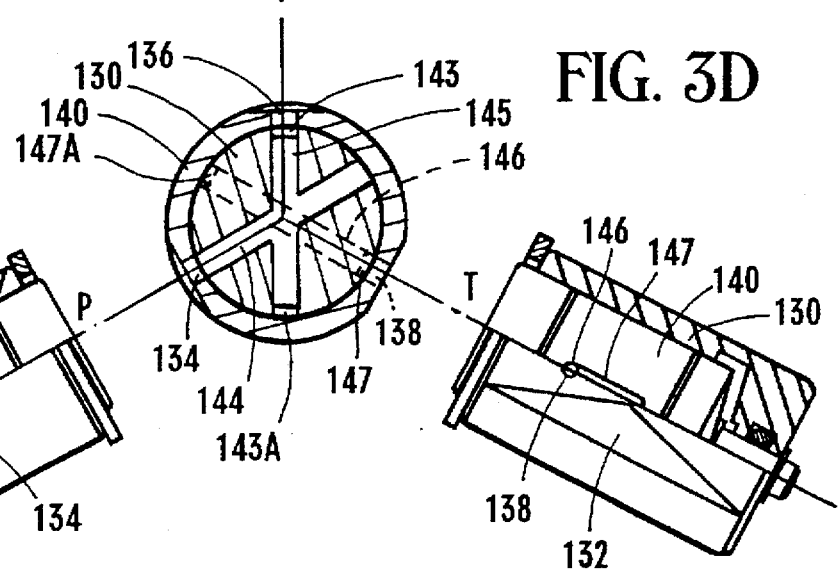
FIG. 3D
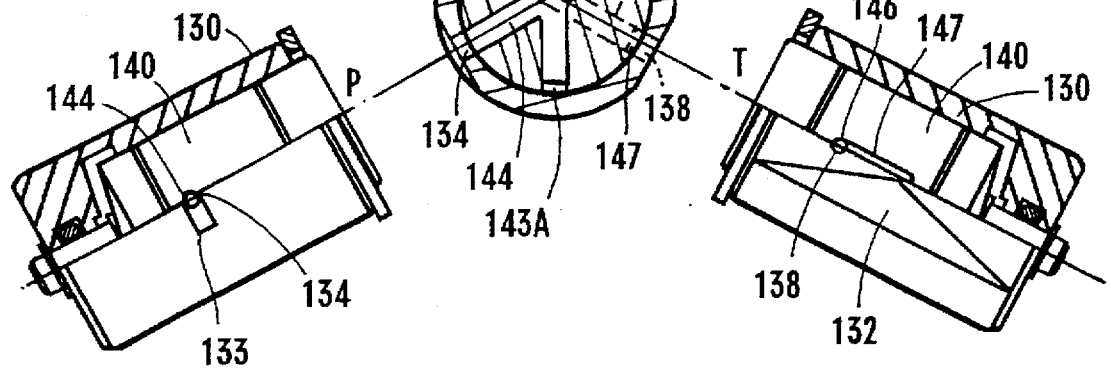
FIG. 3B
FIG. 3C

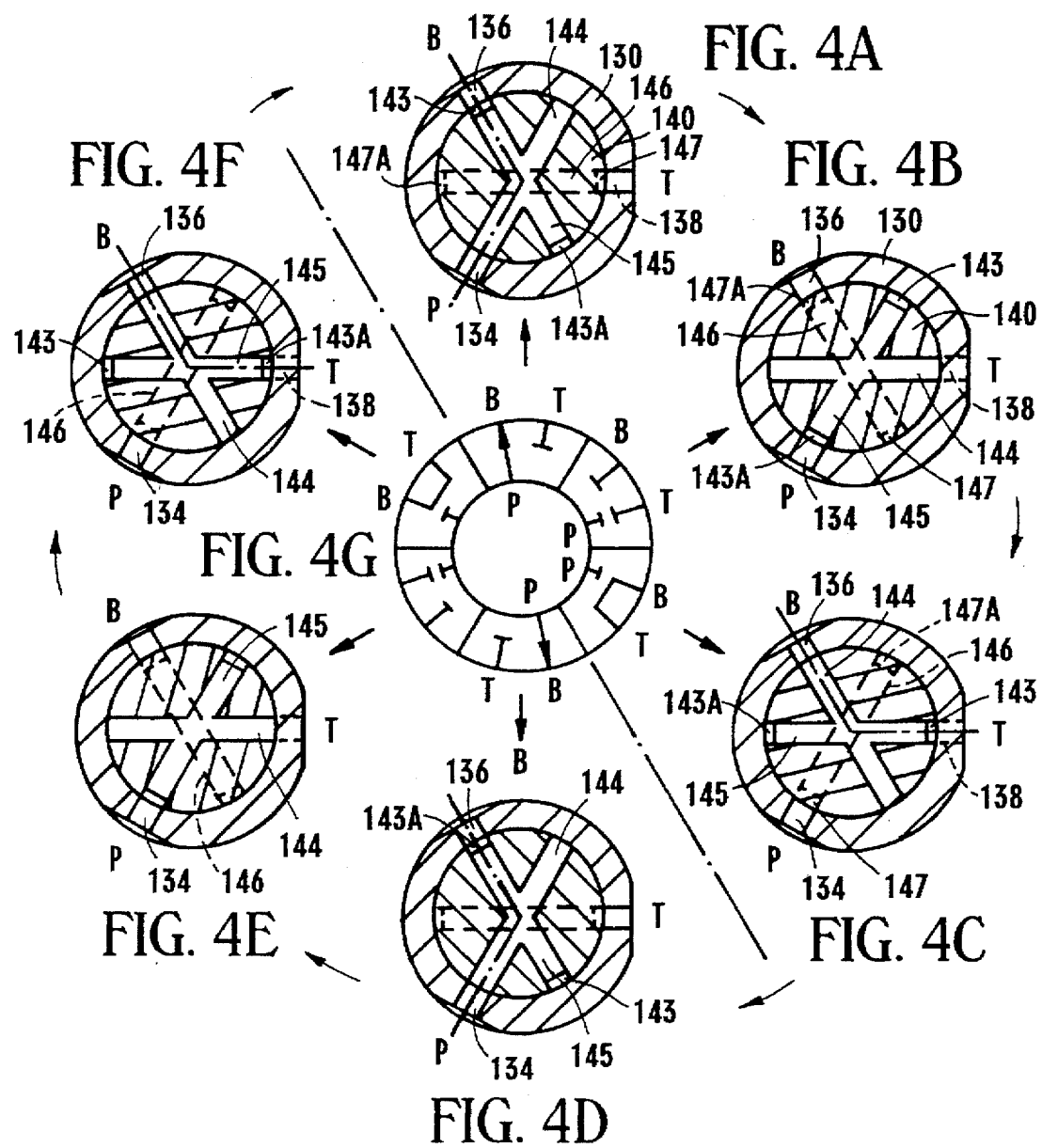

APPARATUS FOR CONTROLLING BRAKE PRESSURE APPLIED TO THE WHEELS OF AUTOMOBILES USING PRESSURE FLUID

BACKGROUND OF THE INVENTION

1. Field of the Invention

The present invention relates to a brake pressure control apparatus for an anti-lock braking system in automobiles, and more particularly to a brake pressure control apparatus for an anti-lock braking system in automobiles, which has a simple construction and easily operates.

2. Prior Arts

Generally, an anti-lock braking system (ABS) is used for preventing the wheels of the automobile from "locking" in the event of a sudden stop of the automobile. The term "locking of the wheels" means that the rolling wheels of the automobile are stopped by the brake pressure applied to the wheels when a driver puts on the brake suddenly while driving the automobile. When the wheels are subjected to this type of locking condition, the wheels slip toward the running direction due to the inertia force of the vehicle so that the frictional force between the wheels and the road surface may be reduced. For this reason, the braking distance may become longer and steering the vehicle may be impossible, thereby causing fatal accidents.

In order to prevent these types of accidents, an anti-lock braking system is provided in the vehicle. The anti-lock braking system increases, maintains, and reduces the brake pressure applied to the wheels rapidly and repeatedly so as to avoid wheel locking, thereby preventing fatal accidents.

Generally, the ABS comprises a valve system operated by a hydraulic pump or an electrical signal in order to increase, maintain and reduce the brake pressure applied to the wheels, a sensor for sensing the RPM of the wheels, and a control unit which operates the ABS according to a predetermined algorithm.

In the ABS as mentioned above, the first step wherein the brake pressure applied to the wheels is increased is called a pressure increasing mode, the second step wherein the brake pressure applied to the wheels is constantly maintained is called a pressure maintaining mode and the third step wherein the brake pressure applied to the wheels is reduced is called a pressure reducing mode.

In the conventional ABS, the pressure increasing mode, the pressure maintaining mode and the pressure reducing mode are performed by operating a solenoid valve.

FIGS. 9A–9C show a solenoid valve 500 under the pressure increasing mode, the pressure maintaining mode and the pressure reducing mode of the conventional ABS, respectively.

As shown in FIGS. 9A–9C, solenoid valve 500 includes a cylindrical valve body 510 and a cover 520 attached to the lower end of cylindrical valve body 510 for preventing the pressure fluid from being leaked. Cylindrical valve body 510 has a first port 512 connected to a wheel cylinder (not shown), a second port 560 through which the pressure fluid circulates to a pump (not shown), a first chamber 516 formed above second port 560, and a second chamber 518 formed below second port 560.

An upper valve seat 550 having a pressure fluid inlet 552 is provided at the upper end of first chamber 516 and a lower valve seat 560 having a pressure fluid outlet 564 is provided at the lower end of first chamber 516. A cylinder 558 is disposed between upper valve seat 550 and lower valve seat 560. At the upper and lower ends of cylinder 558, there are provided first and second balls 554 and 562, respectively. First ball 554 is in contact with upper valve seat 550, and second ball 562 is in contact with lower valve seat 560.

In addition, first and second springs 556 and 566 are accommodated in cylinder 558 in such a manner that first and second springs 556 and 566 can elastically support first and second balls 554 and 562, respectively. Between first and second springs 556 and 566, there is disposed a head portion 534 of a movable plunger 532. Head portion 534 pushes first spring 556 when plunger 532 moves upwards, thereby pressure fluid inlet 552 of upper valve seat 550 is closed by first ball 554.

Second chamber 518 of valve body 510 includes an armature 530 securely coupled to one end of plunger 532, a bush 542 inserted in the upper end portion of second chamber 518 in order to guide the movement of plunger 532, and a solenoid 540 which applies the magnetic force to armature 530 thereby moving armature 530 upwards. Between armature 530 and the underside of lower valve seat 560, a third spring 576 is disposed for elastically supporting armature 530.

The conventional solenoid valve having the above structure operates as follows.

When a driver puts on the brake suddenly, the speed of the vehicle suddenly decreases. At this time, a speed sensor (not shown) attached to the wheel of the vehicle senses the decreased speed and then sends the data to an electrical control unit (ECU, not shown). Upon receiving the data from the speed sensor, the ECU compares value of the data with a predetermined value which is preset in the ECU. If the value of the data exceeds the predetermined value, the ECU operates the ABS according to a predetermined algorithm. That is, the brake pressure applied to the wheels of the vehicle is continuously increased (the pressure increasing mode), constantly maintained (the pressure maintaining mode) or reduced (the pressure reducing mode) in accordance with the predetermined algorithm of the ECU.

In the pressure increasing mode, as shown in FIG. 9A, the ECU operates a hydraulic pump (not shown) so that the pressure fluid flows into pressure fluid inlet 552 from the hydraulic pump while pushing first ball 554 downwards. Then, the pressure fluid that has flowed into pressure fluid inlet 552 is applied to the wheel cylinder connected to the wheels through first port 512, so that the brake pressure to the wheels increases.

Next, electric power is applied to solenoid 540 so that magnetic power is generated by solenoid 540. As the magnetic power is generated, armature 530 moves upwards while overcoming the bias force of third spring 576.

When armature 530 moves upwards, plunger 532 securely inserted in armature 530 also moves upwards while pushing first spring 556 upwards. Therefore, as shown in FIG. 9B, pressure fluid inlet 552 is closed by first ball 554.

From this state, the pressure fluid does not flow into solenoid valve 500 so that solenoid valve 500 maintains the pressure maintaining mode, wherein the constant brake pressure is applied to the wheels.

While, as the electric power is continuously applied to solenoid 540, armature 530 moves upwards to the underside of bush 542 inserted in the upper end portion of second chamber 518 of valve body 510 as shown in FIG. 9C. Accordingly, second ball 562 rested in lower valve seat 560 is simultaneously pushed by a neck portion 536 of plunger 532 so that second ball 563 moves upwards. At this time, the pressure fluid leaks through a free gap formed between pressure fluid outlet 564 of lower valve seat 560 and plunger 532, and then, the leaked pressure fluid is exhausted to a fluid tank (not shown) through second port 514. From this state, solenoid valve 500 maintains the pressure reducing mode wherein the brake pressure applied to the wheels of the vehicle reduces.

The conventional solenoid valve rapidly repeats the above pressure increasing mode, the pressure maintaining mode and the pressure reducing mode in a short time period, thereby preventing the wheels from locking even when the driver suddenly puts on the brake.

However, since the conventional solenoid valve requires various elements, the construction of the conventional solenoid valve may be complicated. Therefore, not only controlling the conventional solenoid valve is difficult, but also the cost for manufacturing the conventional solenoid valve is increased.

Further, the first, second and third springs must be manufactured accurately for performing the pressure increasing mode, the pressure maintaining mode arid the pressure reducing mode of the solenoid valve precisely. Thus, the manufacturing of the solenoid valve is difficult.

On the other hand, a U.S. patent application entitled "a brake pressure control apparatus for an anti-lock braking system in automobiles" which is manufactured at a low cost with a simple construction and is easily operated, has been filed by the applicant of the present invention and now is pending.

In the above brake pressure control apparatus, the pressure increasing mode, the pressure maintaining mode and the pressure reducing mode are performed by operating a rotary valve without using the solenoid valve.

However, in the above brake pressure control apparatus, the rotary valve does not exactly return to its initial position in which the rotary valve communicates with a wheel cylinder so as to perform the pressure increasing mode, after the first ABS operation has finished.

That is, after the first ABS operation has finished, it is possible for the rotary valve to be stopped at the second position in which the communication between the rotary valve and the wheel cylinder is closed such that the pressure maintaining mode is performed, or the third position in which the rotary valve communicates with a fluid tank so as to perform the pressure reducing mode. In this case, the wheels of vehicle slip toward the running direction momentarily as the second ABS operation starts.

In other words, if the rotary valve is stopped at the first position after the first ABS operation has finished, the braking pressure flows instantly from a hydraulic pump to the wheel cylinder through the rotary valve when the second ABS operation starts, thereby the normal second ABS operation is performed.

On the contrary, if the rotary valve is stopped at the second position or third position after the first ABS operation has finished, since the communication between the rotary valve and the wheel cylinder is closed, the braking pressure does not instantly flow from the hydraulic pump to the wheel cylinder when the driver suddenly puts on the brake. Accordingly, the second ABS operation is momentarily delayed, and thereby the wheels of the vehicle slip in the running direction.

This type of slip confuses the driver and causes accidents.

SUMMARY OF THE INVENTION

The present invention has been made to overcome the above described problems of the prior arts, and accordingly it is an object of the present invention to provide a brake pressure control apparatus for automobiles with an anti-lock braking system, which can be easily operated with a simple construction, can be manufactured with a reduced cost, and in which a rotary valve can be immediately returned to its initial position after the first ABS operation has finished in order to prepare the second ABS operation.

To achieve the above object, the present invention provides a brake pressure control apparatus for an anti-lock braking system in automobiles, the apparatus comprising:

a housing connected to a hydraulic pump so as to introduce a pressure fluid from the hydraulic pump to the brake pressure control apparatus;

a motor for generating a rotational force according to an operating signal from an electrical control unit;

a bushing for guiding the pressure fluid which has flowed through the housing into the brake pressure control apparatus;

a rotary valve for receiving the pressure fluid from the bushing, the rotary valve being rotatably and movably accommodated in the bushing and rotated by the motor so as to transfer the pressure fluid to a wheel cylinder or a fluid tank alternately; and a spring for pushing the rotary valve downwards.

According to a preferred embodiment of the present invention, the housing has a first chamber for receiving the bushing, a second chamber for receiving the fluid pressure from the hydraulic pump so as to move the rotary valve upwards, a first fluid path connected to the hydraulic pump in order to guide the pressure fluid to the bushing, a second fluid path connected to the wheel cylinder so as to guide the pressure fluid which has passed through the bushing to the wheel cylinder, and a third fluid path connected between the second fluid path and the second chamber in order to guide the pressure fluid from the hydraulic pump to the second chamber.

At an upper portion of the housing, there is disposed a snap ring for preventing the bushing from separating therefrom.

The bushing has a cylindrical shape and a portion of its outer wall is formed as a plane portion so as to easily return the pressure fluid to the fluid tank. The bushing has a first cylindrical hole, an inclined portion, a seat portion and a second cylindrical hole in its inner portion.

The rotary valve has a body portion accommodated in the first cylindrical hole of the bushing, a shaft extended through the second cylindrical hole of the bushing and formed at a predetermined position thereof with a slot, and a flange formed between the body portion and the shaft. The flange is rested in the seat portion of the bushing.

A stop ring is mounted on the slot of the shaft of the rotary valve. The stop ring comes in contact with an under side of the bushing when the rotary valve has moved upwards at a predetermined length By the pressure fluid that has flowed into the second chamber of the housing, so that the upper surface of rotary valve 140 does not contact the under surface of motor 120 even when rotary valve 140 has moved upwards.

The brake pressure control apparatus for anti-lock braking system in vehicles according to the present invention has a simple construction and can be easily manufactured.

Further, the brake pressure control apparatus has a compact size so that it can be easily applied to an ABS.

Furthermore, the brake pressure control apparatus does not require many elements so that the cost for manufacturing the brake pressure control apparatus can be reduced.

In addition, in the brake pressure control apparatus of the present invention, the rotary valve can be immediately returned to its initial position after the first ABS operation has finished, so that the slip of wheels can be prevented when the second ABS operation starts.

BRIEF DESCRIPTION OF THE DRAWINGS

The above objects and other advantages of the present invention will become more apparent by describing in detail preferred embodiments thereof with reference to the attached drawings, in which:

FIGS. 3A, 3B and 3C are partial sectional views of the rotary valve shown in FIG. 1;

FIG. 3D is a sectional plan view of the rotary valve shown in FIG. 1;

FIGS. 4A, 4B, 4C, 4D, 4E and 4F are sectional views showing the pressure increasing mode, the pressure maintaining mode and the pressure reducing mode of the brake pressure control apparatus according to one embodiment of the present invention;

FIG. 4G is a schematic view showing the flow of the pressurized fluid.

DESCRIPTION OF THE PREFERRED EMBODIMENTS

Hereinafter, the present invention will be described in detail with reference to the accompanying drawings.

Figure 1:
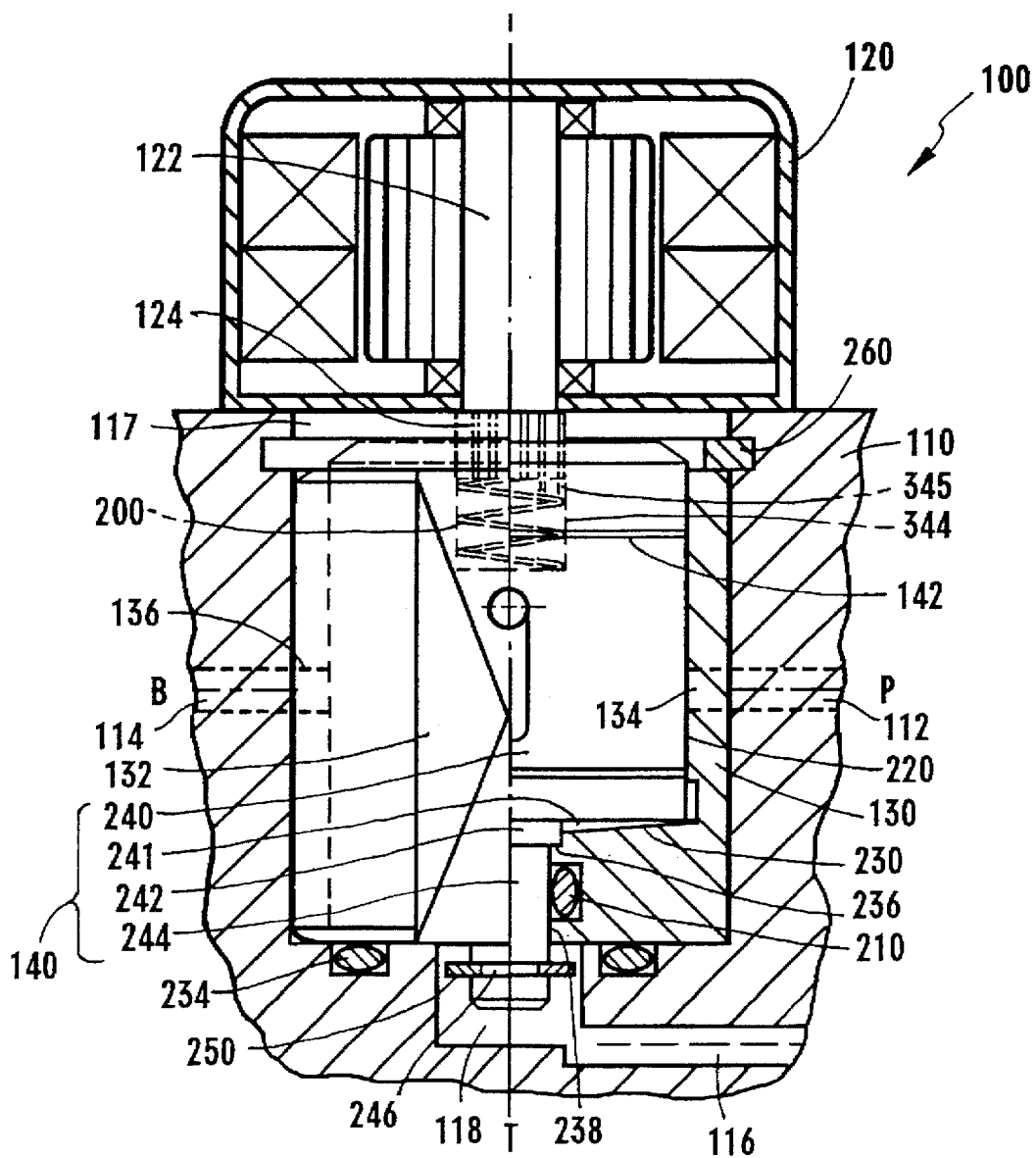
FIG. 1 is a sectional view for showing a brake pressure control apparatus used in an anti-lock braking system according to one embodiment of the present invention.

FIG. 1 shows a brake pressure control apparatus 100 for an anti-lock braking system in automobiles according to one embodiment of the present invention.

As shown in FIG. 1, brake pressure control apparatus 100 has a housing 110 connected to a hydraulic pump P so as to guide pressure fluid from hydraulic pump P to brake pressure control apparatus 100. A motor 120 is mounted on an upper surface of housing 110 in order to generate a rotational force according to operating signal from an electrical control unit (ECU). A bushing 130 is securely inserted in housing 110 so as to guide the pressure fluid which has flowed through housing 110 into brake pressure control apparatus 100. Further, a rotary valve 140 is rotatably and movably accommodated in bushing 130 and is receiving the pressure fluid from bushing 130. Rotary valve 140 is rotated by motor 120 so that the pressure fluid which has flowed through bushing 130 into rotary valve 140 is transferred to a wheel cylinder B or fluid tank T, alternately. In addition, a spring 200 is inserted in the upper portion of rotary valve 140 in such a manner that it can push rotary valve 140 downwards.

Housing 110 has a first chamber 117 for receiving bushing 130 and a second chamber 118 which receives the fluid pressure introduced from hydraulic pump P so as to move rotary valve 140 upwards. In addition, housing 110 is formed with a first fluid path 112 connected to hydraulic pump P in order to guide the pressure fluid to bushing 130, a second fluid path 114 connected to wheel cylinder B so as to guide the pressure fluid which has passed through bushing 130 to wheel cylinder B, and a third fluid path 116 connected between second fluid path 114 and second chamber 118 in order to guide the pressure fluid from hydraulic pump P to second chamber 118.

Third fluid path 116 is connected to hydraulic pump P before first fluid path 112, so that the pressure fluid is firstly supplied to third fluid path 116 when the ABS operates.

Motor 120 has a motor shaft 122 formed integrally with a spline shaft 124 at one end thereof. Spline shaft 124 is inserted in a spline groove 345 of an opening 344 formed at the center of the upper surface of rotary valve 140, so that rotary valve 140 may rotate as motor shaft 122 of motor 120 rotates.

Figure 5:
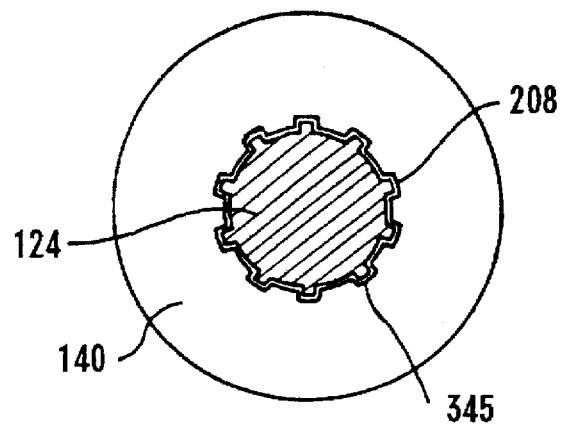
FIG. 5 is a sectional view taken along with the line S—S in FIG. 2.

While, as shown in FIG. 5, a gap 208 is formed between spline shaft 124 and spline groove 345 in such a manner that rotary value 140 can easily move upwards and downwards along spline shaft 124.

Bushing 130 has a cylindrical shape and some portion of its outer wall (i.e., the portion adjacent to fluid tank T) is shaped as a plane portion 132 in order to easily return the pressure fluid to fluid tank T. In addition, bushing 130 is formed in its inner portion with a first cylindrical hole 220, an inclined portion 230, a seat portion 236 and a second cylindrical hole 238.

Figure 6:
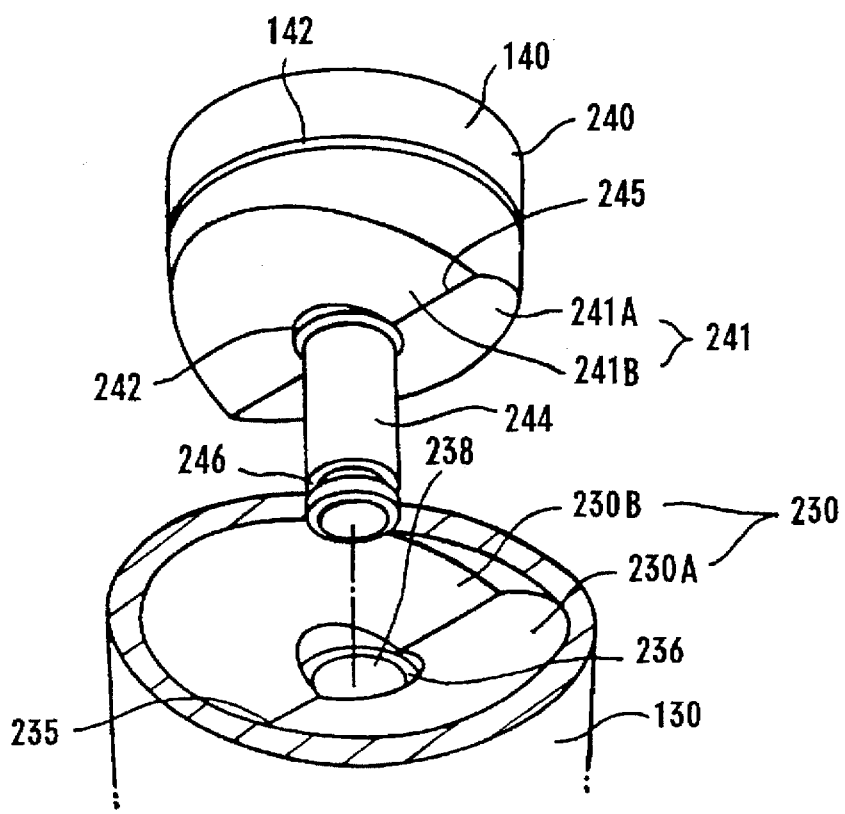
FIG. 6 is a perspective view for showing structures of the rotary valve and a bushing as shown in FIG. 1.

As shown in FIG. 6, inclined portion 230 of bushing 130 includes a first inclined surface 230A and a second inclined surface 230B which are symmetrically shaped with each other and sloped downwards toward a first boundary line 235 formed at the center therebetween.

As shown in FIGS. 3A to 3D, bushing 130 has first and second cutting portions 133 and 135 at its cylindrical outer wall for easily introducing or discharging the pressure fluid. First cutting portion 133 is located in correspondence to first fluid path 112 of housing 110 in such a manner that the pressure fluid can easily flow from first fluid path 112 of housing 110 into bushing 130, and second cutting portion 135 is located in correspondence to second fluid path 114 of housing 110 in such a manner that the pressure fluid that has passed through bushing 130 can easily flow into second fluid path 114 of housing 110. Both first and second cutting portions 133 and 135 have a rectangular groove shape, and can be made by a machine work, such as a lathe work.

First and second cutting portions 133 and 135 are positioned at the same longitudinal level. However, second cutting portion 135 is spaced clockwise at an angle of 120 degrees apart from first cutting portion 133. On the other hand, plane portion 132 of bushing 130 is spaced counter-clockwise at an angle of 120 degrees apart from first cutting portion 133.

At the bottom of first cutting portion 133 of bushing 130, an inlet hole 134 is formed for guiding pressure fluid into rotary valve 140. An outlet hole 136 for guiding pressure fluid to wheel cylinder B is formed at the bottom of second cutting portion 135 of bushing 130. In addition, plane portion 132 of bushing 130 has a perforation hole 138 which connects rotary valve 140 to fluid tank T. Perforation hole 138 of bushing 130 is longitudinally spaced at a predetermined length from inlet and outlet holes 134 and 136 of bushing 130.

Referring again to FIG. 1, rotary valve 140 includes a body portion 240 accommodated in first cylindrical hole 220 of bushing 130 and a shaft 244 which extends through second cylindrical hole 238 of bushing 130. Between body portion 240 and shaft 244, there is provided a flange 242 rested in seat portion 236 of bushing 130.

Rotary valve 140 is integrally formed at its one end portion with a protuberance portion 241 which is seated on inclined portion 230 of bushing 130. As shown in FIG. 6, protuberance portion 241 of rotary valve 140 includes a first protuberance surface 241A and a second protuberance surface 241B which are symmetrically shaped with each other and protruded toward a second boundary line 245 formed at the center therebetween. For the purpose of reducing the friction between rotary valve 140 and bushing 130 and thereby ensuring the movement of rotary valve 140, protuberance portion 241 of rotary valve 140 has a radius smaller than that of inclined portion 230 of bushing 130.

Referring again to FIG. 3, body portion 240 of rotary valve 140 is provided with first, second, and third ports 144, 145 and 146. As rotary valve 140 rotates, first, second and third ports 144, 145 and 146 of rotary valve 140 alternately communicate with inlet, outlet and perforation holes 134, 136 and 138 of bushing 130 in such a manner that the pressure fluid which hag flowed through bushing 130 can be transferred to wheel cylinder B or can be returned to fluid tank T.

First, second and third ports 144, 145 and 146 are extended so as to pass through rotary valve 140. In addition, first and second ports 144 and 145 of rotary valve 140 are communicated with each other at the same plane, and third port 146 of rotary valve 140 is longitudinally spaced at a predetermined length from first and second ports 144 and 145.

While, second port 145 is spaced clockwise at an angle of 120 degrees apart from first port 144, and third port 146 is spaced clockwise at an angle of 120 degrees apart from second port 145, although third port 146 has a different longitudinal level with respect to first and second ports 144 and 145.

Accordingly, rotary valve 140 is divided into six planes by first, second and third ports 144, 145 and 146, as seen in plan view.

In addition, body portion 240 of rotary valve 140 has a first elongated groove 143 extended downwards from one end of second port 145, a second elongated groove 143A extended downwards from the other end of second port 145, a third elongated groove 147 extended upwards from one end of third port 146, and a fourth elongated groove 147A extended upwards from the other end of third port 146.

First and second elongated grooves 143 and 143A have the same size as third and fourth elongated grooves 147 and 147A. As rotary valve 140 rotates, first, second, third and fourth elongated grooves 143, 143A, 147 and 147A are alternately and continuously communicated with inlet, outlet and perforation holes 134, 136 and 138 of bushing 130, so that the pressure increasing mode, the pressure maintaining mode and the pressure reducing mode may be continuously performed.

In addition, oil grooves 142 are formed around the outer wall of body portion 240 of rotary valve 140. While the ABS is being operated, some brake oil leaks into oil grooves 142 so that the friction between the outer wall of rotary valve 140 and the inner wall of bushing 130 caused by the rotation of rotary valve 140 can be reduced. Oil groove 142 is formed at both upper and lower portions of rotary valve 140 so as to keep the balance of the fluid pressure.

Referring again to FIG. 1, a slot 246 for mounting a stop ring 250 is formed at a predetermined position of shaft 244 of rotary valve 140. Stop ring 250 mounted on slot 246 comes into contact with the under side of bushing 130 when rotary valve 140 has moved upwards at a predetermined length by the pressure fluid flowed into second chamber 118 of housing 110, so that the upper surface of rotary valve 140 does not contact the under surface of motor 120 even when rotary valve 140 has moved upwards.

Spring 200 accommodated in opening 344 of rotary valve 140 is compressed by the upward movement of rotary valve 140 as the ABS operates, and is pushing rotary valve 140 downwards when the operation of the ABS has finished.

While, in order to prevent the pressure fluid from being leaked to fluid tank T, a first O-ring 210 is disposed between the inner wall of bushing 130 and shaft 244 of rotary valve 140, and a second O-ring 234 is disposed between the bottom wall of first chamber 117 and the under surface of bushing 130.

Further, a snap ring 260 which is in contact with the upper surface of bushing 130 so as to prevent bushing 130 from being separated therefrom, is disposed at the upper portion of first chamber 117.

The operation modes of brake pressure control apparatus 100 having the above structure are shown in FIG. 4.

As shown in FIGS. 4A to 4G, brake pressure control apparatus 100 according to the present invention has the pressure increasing mode wherein the brake pressure applied to the wheels is increased, the pressure maintaining mode wherein the brake pressure applied to the wheels is constantly maintained and the pressure reducing mode wherein the brake pressure applied to the wheels is reduced.

However, in the brake pressure control apparatus of the present invention, the pressure increasing mode, the pressure maintaining mode and the pressure reducing mode are performed by operating rotary valve 140 without using the solenoid valve.

Hereinafter, the operation of brake pressure control apparatus 100 of the present embodiment will be described with reference to FIG. 4.

Firstly, when a driver suddenly puts on the brake, the speed of the vehicle suddenly decreases. At this time, a speed sensor (not shown) attached to the wheel of the vehicle senses the decreased speed and then sends the data to the ECU. Upon receiving the data from the sensor, the ECU compares the value of data with a predetermined value. When the value of the data exceeds the predetermined value, the ECU operates the ABS according to a predetermined algorithm. That is, the ECU applies an operating signal to a driving motor (not shown) which drives hydraulic pump P, so that the pressure fluid is supplied from hydraulic pump P to brake pressure control apparatus 100.

As mentioned above, the pressure fluid is firstly supplied to second chamber 118 of housing 110 through third fluid path 116 which is adjacent to hydraulic pump P.

Figure 2:
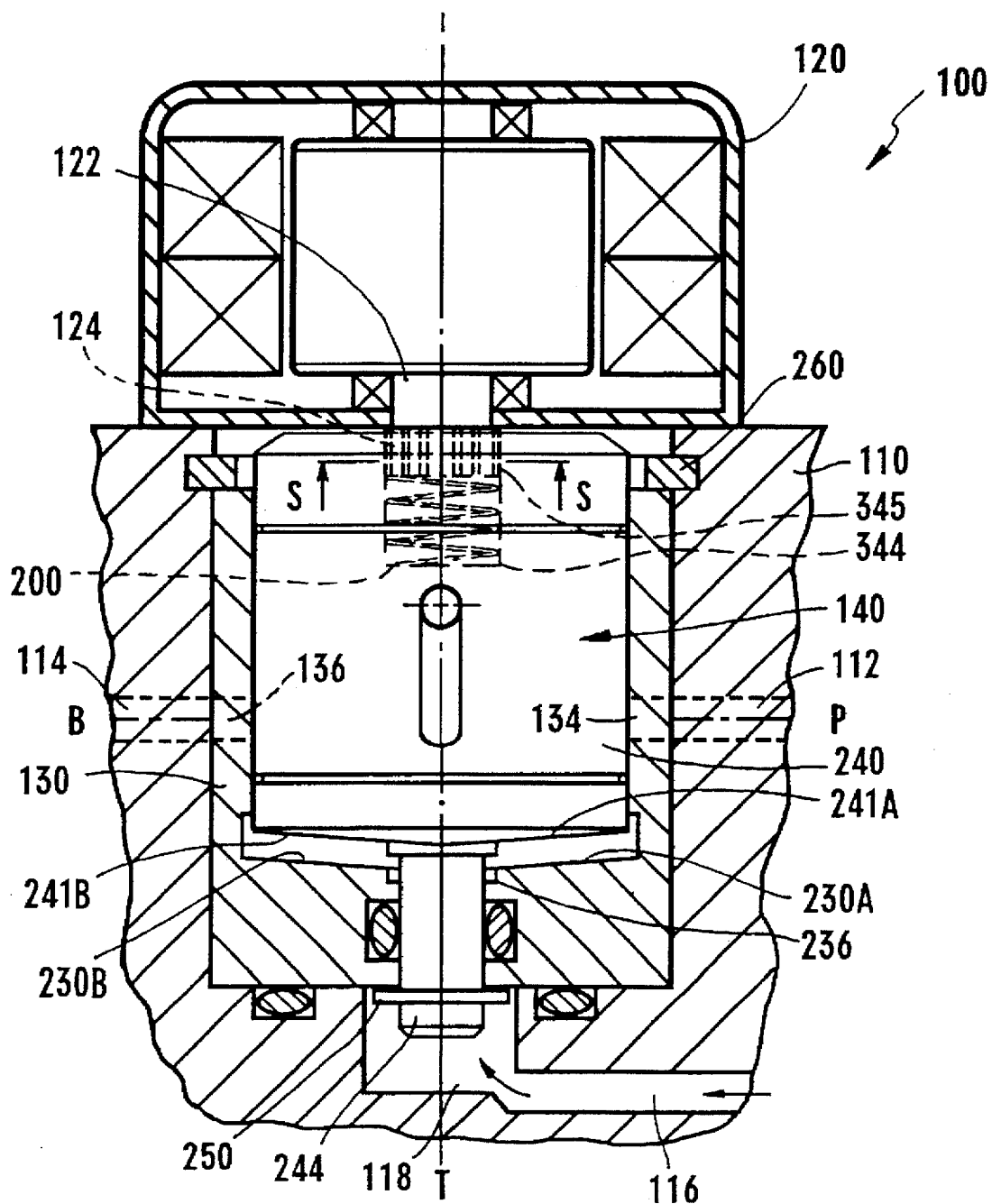
FIG. 2 is a sectional view of the brake pressure control apparatus as shown in FIG. 1, wherein a rotary valve has moved upwards by fluid pressure applied thereto.

As shown in FIG. 2, the pressure fluid flowing into second chamber 118 applies a pressure to the under side of shaft 244 and the under surface of stop ring 250, so that rotary valve 140 moves upwards along spline shaft 124 of motor 120 while overcoming the bias force of spring 200.

At this time, as described above, since gap 208 is formed between spline shaft 124 of motor 120 and spline groove 345 of rotary valve 140, rotary valve 140 can easily move upwards along spline shaft 124 without contacting spline shaft 124. In addition, when rotary valve 140 has moved upwards at a predetermined length, stop ring 250 comes into contact with the upper surface of bushing 130 so that the upper surface of rotary valve 140 does not contact the under surface of motor 120.

When rotary valve 140 has moved upwards as shown in FIG. 2, one end of first port 144 of rotary valve 140 communicates with inlet hole 134 of bushing 130, and one end of second port 145 of rotary valve 140 communicates with outlet hole 136 of bushing 130 as shown in FIGS. 4A to 4G.

From this state, the pressure increasing mode starts.

In the pressure increasing mode, the pressure fluid is introduced into first port 144 of rotary valve 140 from hydraulic pump P through first fluid path 112 of housing 110, first curing portion 133 and inlet hole 134 of bushing 130.

Next, since both the other end of first port 144 and the other end of second port 145 are closed by the inner wall of bushing 130, the pressure fluid that has been introduced into first port 144 of rotary valve 140 flows into second fluid path 114 connected to wheel cylinder B, through second port 145 of rotary valve 140, outlet hole 136 and second curing portion 135 of bushing 130. Thereafter, the pressure fluid that has flowed into second fluid path 114 of housing 110 is introduced into wheel cylinder B connected to the wheels of the vehicle so that brake pressure applied to the wheels of the vehicle increases.

On the other hand, although third port 146 of rotary valve 140 communicates with fluid tank P, the pressure fluid does not return to fluid tank T because the pressure fluid can not flow into third port 146 of rotary valve 140.

Then, the ECU applies an operating signal to motor 120 so that rotary valve 140 is rotated clockwise by motor 120.

As stated above, since some brake oil leaks into oil groove 142, the friction between the outer wall of rotary valve 140 and the inner wall of bushing 130 can be reduced when rotary valve 140 rotates.

When rotary valve 140 has rotated at an angle of 60 degrees, one end of second port 145 of rotary valve 140 communicates with inlet hole 134 of bushing 130 and one end of third port 146 of rotary valve 140 communicates with outlet hole 136 of bushing 130 through fourth elongated groove 147A.

From this state, the pressure maintaining mode starts.

In the pressure maintaining mode, since the other end of second port 145 and both ends of first port 144 are closed by the inner wall of bushing 130, the pressure fluid which has flowed into second port 145 of rotary valve 140 from hydraulic pump P remains in first and second ports 144 and 145 of rotary valve 140. That is, the pressure fluid is not introduced into wheel cylinder B. In addition, since the other end of third port 146 of rotary valve 140 is closed by the inner wall of bushing 130, the pressure fluid that has been introduced into wheel cylinder B dose not flow backwards so that the brake pressure applied to the wheels is constantly maintained.

On the other hand, since first port 144 of rotary valve 140 is located below perforation hole 138 of bushing 130, first port 144 of rotary valve 140 can not communicate with perforation hole 138 of bushing 130 so that the pressure fluid does not return to fluid tank T.

Next, when rotary valve 140 has further rotated clockwise at an angle of 60 degrees by motor 120, one end of third port 146 of rotary valve 140 communicates with inlet hole 134 of bushing 130 through third elongated groove 147 and one end of first port 144 of rotary valve 140 communicates with outlet hole 136 of bushing 130. In addition, one end of second port 145 of rotary valve 140 communicates through first elongated groove 143 with perforation hole 138 connected to fluid tank T.

From this state, the pressure reducing mode starts.

In the pressure reducing mode, since the other end of third port 146 is closed by the inner wall of bushing 130, the pressure fluid which has flowed into third port 146 of rotary valve 140 from hydraulic pump P remains in third port of rotary valve 140 so that the pressure fluid is not introduced into wheel cylinder B.

However, as mentioned above, since second port 145, which communicates with perforation hole 138 of bushing 130 through first elongated groove 143, is also communicated with wheel cylinder B through first port 144 of rotary valve 140, the pressure fluid that has been introduced into wheel cylinder B may return to fluid tank T through second cutting portion 135 of bushing 130, second port 145 of rotary valve 140, first elongated groove 143 and perforation hole 138 of bushing 130, due to the pressure difference between second port 145 of rotary valve 140 and fluid tank T. Thus, the brake pressure applied to the wheels is reduced.

On the other hand, as described above, since bushing 130 has plane portion 132 in the vicinity of fluid tank T, the pressure fluid may easily return to fluid tank T.

Furthermore, in the course of each mode, third port 146 of rotary valve 140, which is longitudinally spaced at a predetermined length apart from first and second ports 144 and 145, is also alternately communicated with inlet, outlet and perforation holes 134, 136 and 138 of bushing 130 so that the pulsation of rotary valve 140 caused by the deviation of the pressure fluid can be reduced.

Brake pressure control apparatus 100 of the present invention rapidly repeats the pressure increasing mode, the pressure maintaining mode and the pressure reducing mode in a short time period, thereby preventing the locking of the wheels when the driver suddenly puts on the brake.

Meanwhile, when the operation of the ABS has finished, the ECU stops the driving motor of hydraulic pump P and motor 120 simultaneously so that the rotation of rotary valve 140 is stopped. At this time, it is possible for rotary valve 140 to be stopped at the second position in which the pressure maintaining mode is performed, or the third position in which pressure reducing mode is performed, rather than be stopped at the first position in which the pressure increasing mode is performed.

Thereafter, since the operation of hydraulic pump P is also stopped, the pressure fluid that has flowed into second chamber 118 of housing 110 returns to fluid tank T through third fluid path 116, so that rotary valve 140 is moved downwards by the bias force of spring 200.

Figure 8:
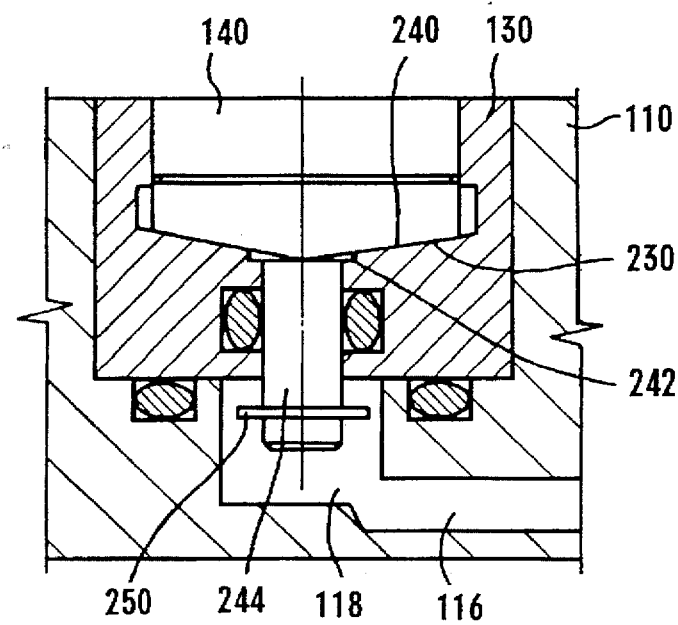
FIG. 8 is a sectional view for showing the rotary valve which has returned to its initial position.
Figure 9A:
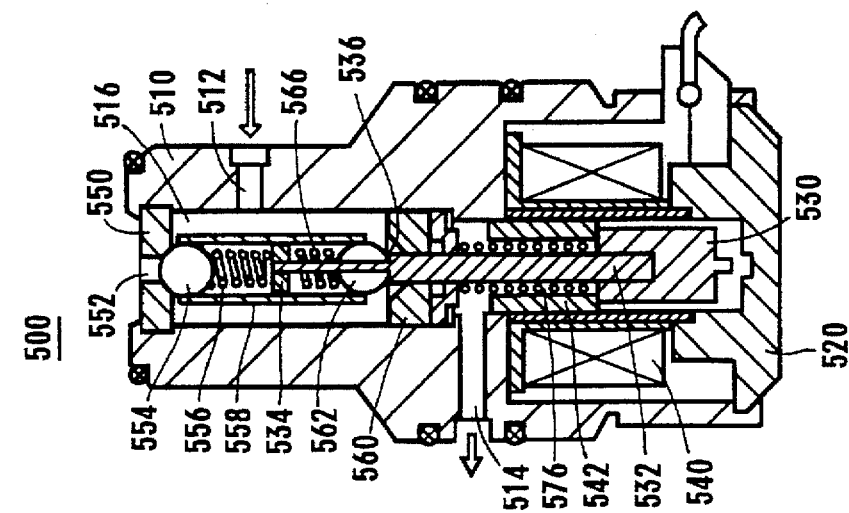
FIGS. 9A to 9C are sectional views for showing a conventional solenoid valve under the pressure increasing mode, the pressure maintaining mode and the pressure reducing mode, respectively.
Figure 9B:
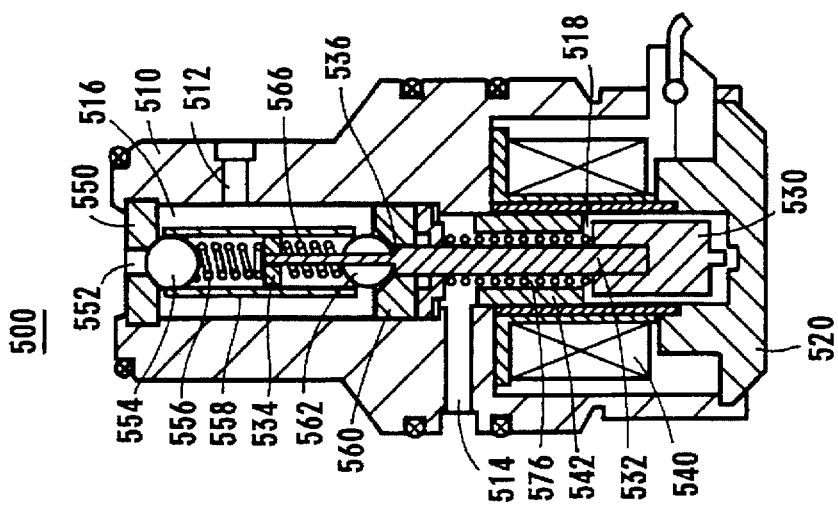
Figure 9C:
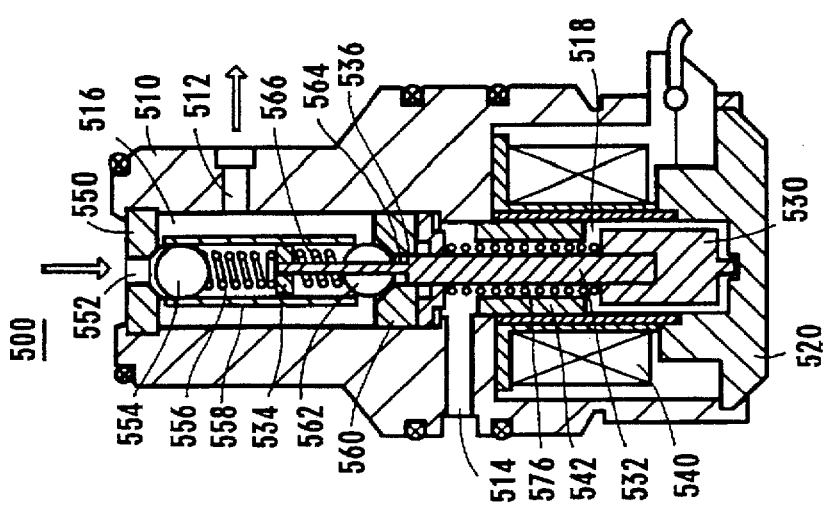

When rotary valve 140 has stopped at the first position, protuberance portion 241 of rotary valve 140 is securely seated on inclined portion 230 of bushing 130 when rotary valve 140 has moved downwards, thereby rotary valve 140 may normally return to its initial position as shown in FIG. 8.

Figure 7:
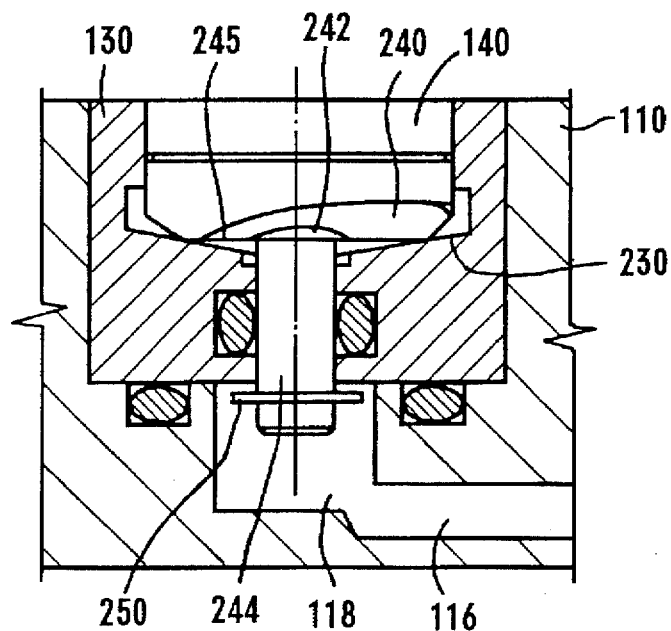
FIG. 7 is a sectional view for showing the rotary valve which has moved downwards by the bias force of a spring.

On the contrary, when rotary valve 140 has stopped at the second position or the third position, second boundary line 245 of rotary valve 140 does not match with first boundary line 235 of bushing 130 when rotary valve 140 has moved downwards as shown in FIG. 7.

However, since inclined portion 230 of bushing 130 is sloped downwards, second boundary line 245 of rotary valve 140 may slide along with first and second inclined surfaces 230A and 230B of inclined portion 230 as soon as it contacts inclined surfaces 230A and 230B of inclined portion 230. Therefore, protuberance portion 241 of rotary valve 140 may be seated on inclined portion 230 of bushing 130.

In result, even when rotary valve 140 has stopped at the second position or third position, rotary valve 140 rotates along inclined portion 230 of bushing 130 so that rotary valve 140 may return to its initial position as shown in FIG. 8.

In this manner, rotary valve 140 always returns to its initial potion after the operation of the ABS has finished. Accordingly, rotary valve 140 can be prepared under the pressure increasing mode when the second ABS operation starts, and thereby preventing the wheels from slipping.

In the meantime, though rotary valve 140 is illustrated as it rotates clockwise, the rotary valve can be rotated counterclockwise by using a reversible motor. In this case, the same braking effect can be realized.

As described above, the brake pressure control apparatus for anti-lock braking system in vehicles according to the present invention has a simple construction and can be easily manufactured.

Further, the brake pressure control apparatus has a compact size so that it can be easily applied to an ABS.

Furthermore, the brake pressure control apparatus does not require many elements so that the cost for manufacturing the brake pressure control apparatus can be reduced.

In addition, in the brake pressure control apparatus of the present invention, the rotary valve can be immediately returned to its initial position after the first ABS operation has finished, so that wheel slipping can be prevented when the second ABS operation starts.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A brake pressure control apparatus for controlling a brake pressure in an automobile, which has a hydraulic pump, a wheel cylinder, and a fluid tank, the apparatus comprising:

a housing for receiving a pressurized fluid from the hydraulic pump, the housing connected to the hydraulic pump;

a first means for generating a rotational force according to an operating signal from an electrical control unit, the first means including a motor having a motor shaft, the motor being mounted on an upper surface of the housing, the motor shaft being formed integrally with a spline shaft at its one end;

a second means for guiding the pressurized fluid which has flowed through the housing;

a third means for receiving the pressurized fluid guided by the second means so as to transfer the pressurized fluid to the wheel cylinder or a fluid tank alternately, the third means being rotatably and movably accommodated in the second means and rotated by the first means; and a fourth means for returning the third means to its initial position, wherein the housing has a first chamber for receiving the second means, a second chamber which receives the fluid pressure from the hydraulic pump in order to move the third means upwards, a first fluid path connected to the hydraulic pump for guiding the pressurized fluid to the second means, a second fluid path connected to the wheel cylinder for guiding the pressurized fluid which has passed through the second means to the wheel cylinder, and a third fluid path connected between the second fluid path and the second chamber for guiding the pressurized fluid from the hydraulic pump to the second chamber, the third fluid path being connected to the hydraulic pump before the first fluid path, the second means includes a cylindrical bushing, the bushing having a plane portion at its outer wall so as to easily return the pressurized fluid to the fluid tank, the bushing being formed in its inner portion with a first cylindrical hole, an inclined portion, a seat portion and a second cylindrical hole, the bushing having a first cutting portion and a second cutting portion at its cylindrical outer wall, the first cutting portion being located in correspondence to the first fluid path of the housing in such a manner that the pressurized fluid can easily flow from the first fluid path of the housing into the bushing, and the second cutting portion being located in correspondence to the second fluid path of the housing in such a manner that the pressurized fluid that has passed through the bushing can easily flow into the second fluid path of the housing, the first cutting portion being provided at a bottom thereof with an inlet hole for receiving the pressurized fluid from the housing, the second cutting portion being provided at a bottom thereof with an outlet hole for guiding the pressurized fluid to the wheel cylinder, and the plane portion being provided with a perforation hole in order to communicate with the fluid tank, the perforation hole being longitudinally spaced upwards at a predetermined length apart from the inlet and outlet holes, the bushing being securely inserted in the housing.

2. The apparatus as claimed in claim 1, wherein the first and the second cutting portions have a rectangular groove shape and are disposed at a same longitudinal level, the second cutting portion being spaced clockwise at an angle of 120 degrees apart from the first cutting portion.

3. The apparatus as claimed in claim 1, wherein the inclined portion includes a first inclined surface and a second inclined surface, the first and second inclined surfaces being symmetrically shaped with each other and sloped downwards toward a first boundary line formed at a center therebetween.

4. The apparatus as claimed in claim 1, wherein the third means includes a rotary valve having a body portion accommodated in the first cylindrical hole of the bushing, a shaft extended through the second cylindrical hole of the bushing, and a flange formed between the body portion and the shaft, the flange being rested in the seat portion of the bushing.

5. The apparatus as claimed in claim 4, wherein the body portion has a first port, a second port, a third port, a first elongated groove extended downwards from a first end of the second port, a second elongated groove extended downwards from a second end of the second port, a third elongated groove extended upwards from a first end of the third port and a fourth elongated groove extended upwards from a second end of the third port, each of the first port, the second port and the third port being alternately communicated with the inlet hole, the outlet hole and the perforation hole as the rotary valve rotates, the body portion being integrally formed at its one end with a protuberance portion seated on the inclined portion of the bushing.

6. The apparatus as claimed in claim 5, wherein the protuberance portion of the rotary valve includes a first protuberance surface and a second protuberance surface, the first and second protuberance surfaces being symmetrically shaped with each other and protruded toward a second boundary line formed at a center therebetween.

7. The apparatus as claimed in claim 6, wherein the protuberance portion of the rotary valve has a radius smaller than that of the inclined portion of the bushing.

8. The apparatus as claimed in claim 4, wherein the rotary valve is provided at its outer wall with oil grooves for reducing a friction between an outer wall of the rotary valve and an inner wall of the bushing when the rotary valve rotates.

9. The apparatus as claimed in claim 4, wherein the rotary valve further comprises an opening formed at a center of an upper surface of the rotary valve, the opening being formed at its upper portion with a spline groove, the spline shaft of the motor being inserted in the spline groove so that the rotary valve may rotate as the spline shaft of the motor rotates.

10. The apparatus as claimed in claim 9, wherein a gap is formed between the spline shaft and the splined groove in such a manner that the rotary valve can easily move upwards and downwards along the spline shaft.

11. The apparatus as claimed in claim 9, wherein the fourth means includes a spring accommodated in the opening of the rotary valve.

12. The apparatus as claimed in claim 4, wherein the first and second ports of the rotary valve are intercrossed with each other at a same plane, the second port being positioned clockwise at an angle of 120 degrees apart from the first port and the third port being positioned clockwise at an angle of 120 degrees apart from the second port in a plan view.

13. The apparatus as claimed in claim 4, wherein the first and second elongated grooves have the same size as the third and fourth elongated grooves, each of the first, the second, the third and the fourth elongated grooves being alternately and continuously communicated with the inlet, the outlet and the perforation holes of the bushing as the rotary valve rotates.

14. The apparatus as claimed in claim 4, wherein a stop ring is mounted on a slot of the shaft of the rotary valve, the stop ring being contacted with an under side of the bushing when the rotary valve has moved upwards at a predetermined length by the pressure fluid that has flowed into the second chamber of the housing.

15. The apparatus as claimed in claim 4, wherein a first O-ring is disposed between an inner wall of the bushing and the shaft of the rotary valve, and a second O-ring is disposed between a bottom wall of the first chamber and an under surface of the bushing in order to prevent the pressure fluid from being leaked to the fluid tank.

16. The apparatus as claimed in claim 1, further comprising a snap ring disposed at an upper portion of the first chamber so as to prevent the bushing from being separated therefrom.

17. A brake pressure control apparatus for controlling a brake pressure in an automobile which has a hydraulic pump, a wheel cylinder, a fluid tank, the apparatus comprising:

a housing connected to the hydraulic pump so as to receive a pressurized fluid from the hydraulic pump;

a motor mounted on an upper surface of the housing for generating a rotational force according to an operating signal from an electrical control unit, the motor having a motor shaft being formed integrally with a spline shaft at its one end;

a cylindrical bushing securely inserted in the housing so as to guide the pressurized fluid which has flowed through the housing ;

a rotary valve rotatably and movably accommodated in the bushing in order to receive the pressurized fluid from the bushing, the rotary valve being rotated by the motor so as to transfer the pressurized fluid to the wheel cylinder or the fluid tank alternately;

a spring mounted on an upper portion of the rotary valve for pushing the rotary valve downwards;

a snap ring disposed at an upper portion of the housing so as to prevent the bushing from being separated therefrom;

a first O-ring disposed between an inner wall of the bushing and the rotary valve in order to prevent the pressurized fluid from being leaked to the fluid tank; and a second O-ring disposed between housing and an under surface of the bushing in order to prevent the pressurized fluid from being leaked to the fluid tank, wherein, the housing has a first chamber for receiving the bushing, a second chamber for receiving the fluid pressure from the hydraulic pump so as to move the rotary valve upwards, a first fluid path connected to the hydraulic pump in order to guide the pressurized fluid to the bushing, a second fluid path connected to the wheel cylinder so as to guide the pressurized fluid which has passed through the bushing to the wheel cylinder, and a third fluid path connected between the second fluid path and the second chamber in order to guide the pressurized fluid from the hydraulic pump to the second chamber, the third fluid path being connected to the hydraulic pump before the first fluid path, the cylindrical bushing has a plane portion at its outer wall so as to easily return the pressurized fluid to the fluid tank, the cylindrical bushing being formed in its inner portion with a first cylindrical hole, an inclined portion, a seat portion and a second cylindrical hole, the cylindrical bushing having a first cutting portion and a second cutting portion at its cylindrical outer wall, the first cutting portion being located so as to correspond to the first fluid path of the housing in such a manner that the pressurized fluid can easily flow from the first fluid path of the housing into the cylindrical bushing, and the second cutting portion being located so as to correspond to the second fluid path of the housing in such a manner that the pressurized fluid that has passed through the cylindrical bushing can easily flow into the second fluid path of the housing, the first cutting portion being provided at a bottom thereof with an inlet hole for receiving the pressurized fluid from the housing, the second cutting portion being provided at a bottom thereof with an outlet hole for guiding the pressurized fluid to the wheel cylinder, and the plane portion being provided with a perforation hole for communicating with the fluid tank, the perforation hole being longitudinally spaced upwards at a predetermined length apart from the inlet and outlet holes, the first and the second cutting portions having a rectangular groove shape and being disposed at a same longitudinal level, the second cutting portion being spaced clockwise at an angle of 120 degrees apart from the first cutting portion, the inclined portion having a first inclined surface and a second inclined surface, the first and second inclined surfaces being symmetrically shaped with each other and inclined downwards toward a first boundary line formed at a center therebetween, the rotary valve has a body portion accommodated in the first cylindrical hole of the cylindrical bushing and formed at its outer wall with oil grooves for reducing a friction between an outer wall of the rotary valve and an inner wall of the bushing, a shaft extended through the second cylindrical hole of the cylindrical bushing and formed at a predetermined position thereof with a slot for mounting the stop ring, and a flange formed between the body portion and the shaft, the flange being rested in the seat portion of the cylindrical bushing, the body portion having a first port, a second port, a third port, a first elongated groove extended downwards from a first end of the second port, a second elongated groove extended downwards from a second end of the second port, a third elongated groove extended upwards from a first end of the third port and a fourth elongated groove extended upwards from a second end of the third port, each of the first port, the second port and the third port being alternately communicated with the inlet hole, the outlet hole and the perforation hole as the rotary valve rotates, the body portion being integrally formed at its one end with a protuberance portion seated on the inclined portion of the cylindrical bushing, the protuberance portion of the rotary valve including a first protuberance surface and a second protuberance surface, the first and second protuberance surfaces being symmetrically shaped with each other and protruded toward a second boundary line formed at a center therebetween, the protuberance portion of the rotary valve having a radius smaller than that of the inclined portion of the cylindrical bushing, the body portion of the rotary valve being provided at a center of an upper surface with an opening, the opening being formed at its upper portion with a spline groove, the spline shaft of the motor being inserted in the spline groove so that the rotary valve may rotate as the spline shaft of the motor rotates, the spline shaft being spaced apart from the spline groove in such a manner that the rotary valve can easily move upwards and downwards along the spline shaft, the spring being accommodated in the opening of the rotary valve, the first and second ports of the rotary valve being intercrossed with each other at a same plane, the second port being positioned clockwise at an angle of 120 degrees apart from the first port and the third port being positioned clockwise at an angle of 120 degrees apart from the second port in a plan view, the first and second elongated grooves having the same size as the third and fourth elongated grooves, each of the first, the second, the third and the fourth elongated grooves being alternately and continuously communicated with the inlet, the outlet and the perforation holes of the cylindrical bushing as the rotary valve rotates.

* * * * *